United States Patent
Miyazaki

[11] Patent Number: 6,082,424
[45] Date of Patent: Jul. 4, 2000

[54] HEAVY DUTY RADIAL TIRE

[75] Inventor: Tatsuya Miyazaki, Akashi, Japan

[73] Assignee: Sumitomo Rubber Industries, Ltd., Hyogo-ken, Japan

[21] Appl. No.: 09/079,517

[22] Filed: May 15, 1998

[30] Foreign Application Priority Data

May 16, 1997 [JP] Japan ..................................... 9-127443

[51] Int. Cl.⁷ ............................... B60C 3/00; B60C 11/04
[52] U.S. Cl. ............................... 152/209.14; 152/209.15; 152/454; 152/901
[58] Field of Search ......................... 152/209.14, 209.15, 152/454, 901

[56] References Cited

U.S. PATENT DOCUMENTS

| | | | |
|---|---|---|---|
| 5,616,195 | 4/1997 | Marquet et al. | 152/209.15 |
| 5,660,652 | 8/1997 | Young et al. | 152/454 |

FOREIGN PATENT DOCUMENTS

| | | | |
|---|---|---|---|
| 1319600 | 6/1993 | Canada | 152/454 |
| 2617096 | 12/1988 | France . | |
| 62-59106 | 3/1987 | Japan | 152/209.15 |
| 2027649 | 2/1980 | United Kingdom . | |
| 9707996 | 3/1997 | WIPO . | |

OTHER PUBLICATIONS

Patent Abstracts of Japan vol. 011, No. 250 (M–616), Aug. 14, 1987 & JP 62 059106 A (Bridgestone Corp), Mar. 14, 1987 *abstract*.

*Primary Examiner*—Steven D. Maki

[57] ABSTRACT

A heavy duty radial tire which comprises a radial carcass ply, a belt comprising at least two plies of cords laid at angles of 10 to 40 degrees to the tire circumferential direction, and a tread portion provided with circumferentially extending two shoulder grooves which divide the tread into a central region and a pair of shoulder regions, the tread profile being a convex curve in the central region but a concave curve in each of the shoulder regions, the concave curve passing radially inwards of a standard line at lest partially, and the standard line defined as a circular arc passing three points on the tread profile in the central region at the tire equator, the axially inner edge of the main groove and the middle thereof. Preferably, the distances To, Tt and Tm measured normally to and radially outwardly from the standard line to the tread profile at the axially outer edge of the main groove, the tread edge and the deepest point therebetween, respectively, satisfy $Tt > To > Tm$. Further, $Tt >= 0$, $To <= 0$, and $Tm < 0$.

9 Claims, 6 Drawing Sheets

HEAVY DUTY RADIAL TIRE

The present invention relates to a heavy duty radial tire, more particularly to an improvement in the tread profile being capable of reducing uneven wear in the tread shoulder region and improving the high speed durability.

Figure 4:
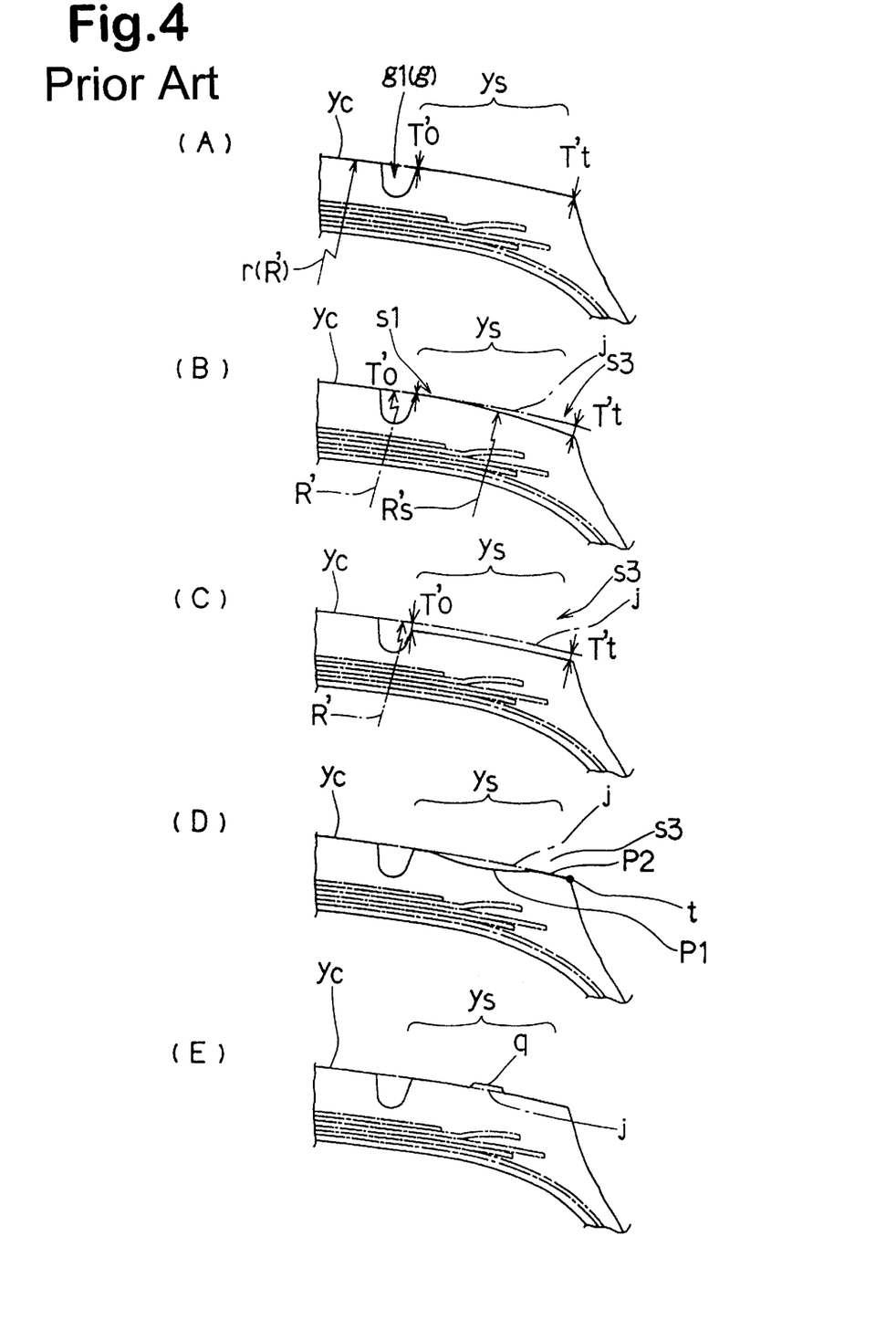
FIGS. 4A to 4E depict prior art tires.

In radial tires for heavy duty vehicles such as trucks, buses and the like, conventionally the tread profile is formed by a substantially single radius (r) curve as shown in FIG. 4 as (A). And tread patterns comprising shoulder ribs defined by shoulder grooves (g1), that is, axially outermost main grooves (g) extending circumferentially of the tire are widely used. In heavy duty radial tires having a low-aspect ratio in particular, as the tread is relatively wide, the restraining force of the tread reinforcing belt is liable to decrease in the tread shoulder regions (ys) in comparison with the central region (yc). Accordingly, the bottom of the shoulder groove (g1) becomes a weak point in rigidity, and the tread rubber is liable to be bent around the groove bottom such that the ground contact pressure is higher in the tread shoulder regions (ys) than the remaining region. This is particularly remarkable when the aspect ratio is lower than 60%. As a result, in the shoulder regions (ys), belt damages such as belt cord end looseness, uneven wear of the tread and the like occur.

Figure 6:
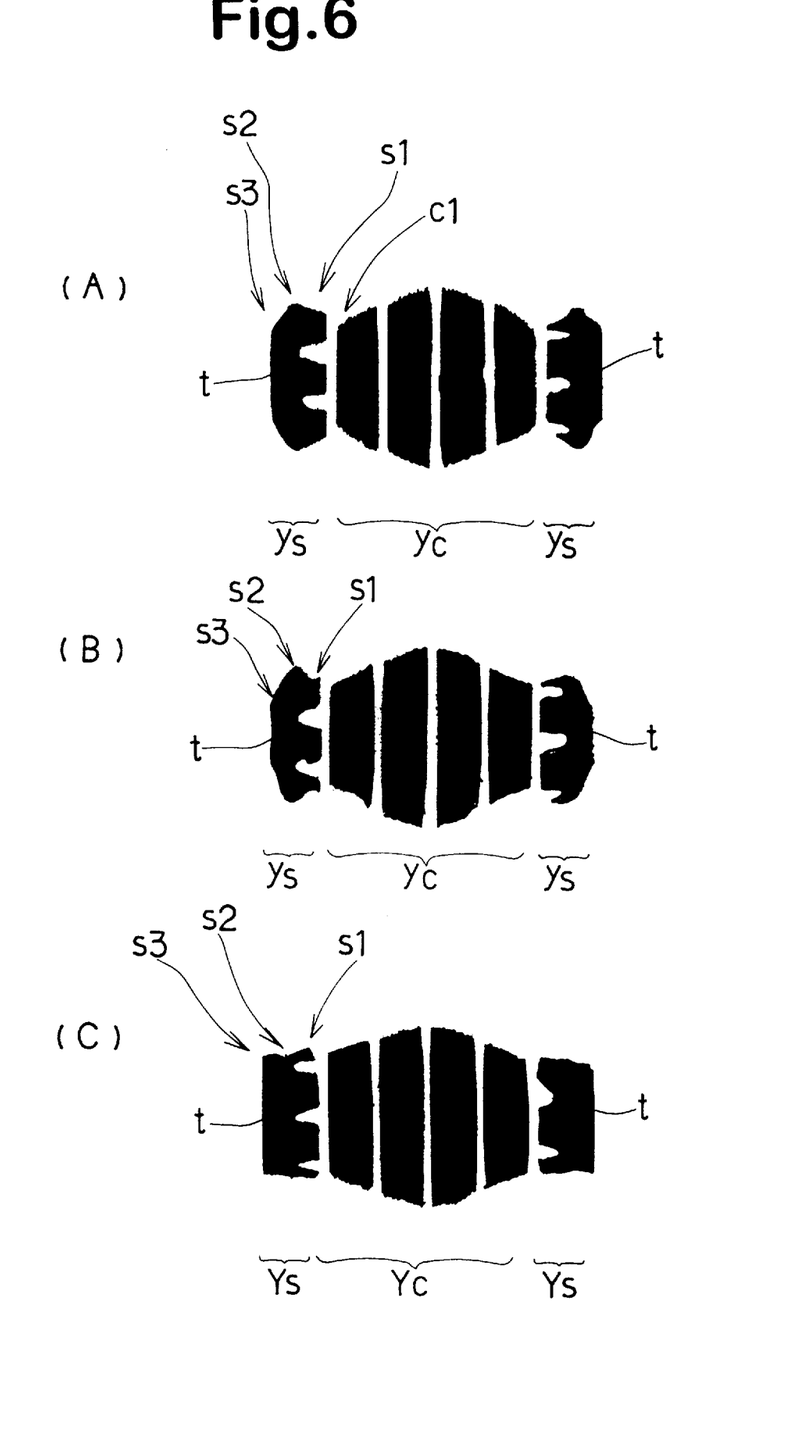
FIGS. 6A to 6E depict foot prints of test tires.

For example, a footprint of such a low-aspect radial tire (size 445/45R19.5) having the tread shoulder profile shown in FIG. 4 as (A) is shown in FIG. 6 as (A), wherein the ground pressure of the tread shoulder region (ys) widely varies, and the pressure is such that axially outer part (s3)<axially inner part (s1)<intermediate part (s2). Further, accompanying therewith, the ground contact pressure is also increased in the axially outer edge (c1) of the tread central region (yc). Such uneven ground pressure distribution in the tread shoulder region (ys) causes uneven wear in this region. Further, as the maximum ground pressure in this region is high, temperature rise and damage of belt, etc. are caused. Further, the difference in the ground pressure between the inner part (s1) and the edge part (c1) also causes uneven wear in the tread central region (yc).

In the laid-open Japanese patent application No.JP-A-61-193903, the radius of curvature of the tread profile is gradually decreased in the shoulder region (ys) as shown in FIG. 4 as (B). In this case, as the tire circumference is too shorter in the outer part (s3) than the inner part (s1), the amount of slip between the tread and ground increases in the outer part (s3), and therefore uneven wear cannot be prevented. The foot print of a tire to which the gradually decreasing radius was applied is shown in FIG. 6 as (B), wherein the ground contact pressure in the intermediate part (s2) is still high, and belt damage is likely to occur.

In the published international patent application No. 92/0280, as shown in FIG. 4 as (C), the diameter of the tire is abruptly decreased from the axially inside to the outside of the shoulder groove (g1). In this case, the ground pressure in the shoulder region (ys) decreases. However, the variation of the ground pressure in this region (ys) is still large, and the outer part (s3) wears rapidly. Thus it is difficult to prevent uneven wear and also belt damages.

In the laid-open Japanese patent application No. JP-A-62-59106, as shown in FIG. 4 as (D), a dent P1 is provided within the shoulder region (ys) apart from the tread edge (t) and the axially outer edge of the shoulder groove. In this case, however, the ground pressure distribution can not be fully optimized, and uneven wear starting from the outer part (s3) is still liable to occur.

In the laid-open Japanese patent application No. JP-A-7-205614, as shown in FIG. 4 as (E), a protrusion (q) is disposed within the shoulder region (ys). In this case, the ground pressure is locally heightened at the protrusion (q), and the heat generation is increased. Further, the protrusion (q) tends to be torn off during running which again causes uneven wear.

It is therefore, a primary object of the present invention is to provide a heavy duty radial tire, in which the ground pressure distribution in the tread shoulder region is evened to improve uneven wear in the shoulder region and to prevent the occurrence of belt damage to improve the durability.

According to one aspect of the present invention, a heavy duty radial tire comprises a radial carcass ply extending between bead portions through a tread portion and sidewall portions, and turned up around a bead core in each bead portion, a belt disposed radially outside said carcass ply and inside the tread, the belt comprising two plies of cords laid at angles of 10 to 40 degrees to the tire circumferential direction, the tread provided with two main grooves extending in the tire circumferential direction to divide the tread into a central region between the axially inner edges of said two main grooves, and a pair of shoulder regions between the axially outer edges of said two main grooves and the axial edges of the tread, the profile of the tread being a convex curve in the central region but a concave curve in each of the shoulder regions, the above-mentioned concave curve passing radially inwards of a standard line at lest partially, on each side of the tire equator, the standard line being defined as a circular arc passing three points on the tread profile in the central region at the tire equator, the axially inner edge of the main groove and the middle thereof.

In the shoulder region, when the distance is measured normally to and radially outwardly from the standard line to the tread profile line, the distances To, Tt and Tm at the axially outer edge of the main groove, the tread edge and the deepest point therebetween, respectively, preferably satisfy the following relationship:

Tt>To>Tm.

Further, the distances To, Tt and Tm t are preferably as follows:

Tt>=0,

To<=0, and

Tm<0.

Accordingly, the ground pressure of the tread shoulder region (ys) can be reduced in the intermediate part (s2) to an adequate ground pressure, and the ground pressure distribution is evened to prevent uneven wear and the local temperature rise. Thus belt damages are prevented and the durability especially during high speed running can be improved. Further, the circumferential length of the footprint at the tread edge (t) is increased, and the cornering performance can be improved.

Embodiments of the present invention will now be described in detail in conjunction with the accompanying drawings.

Figure 1:
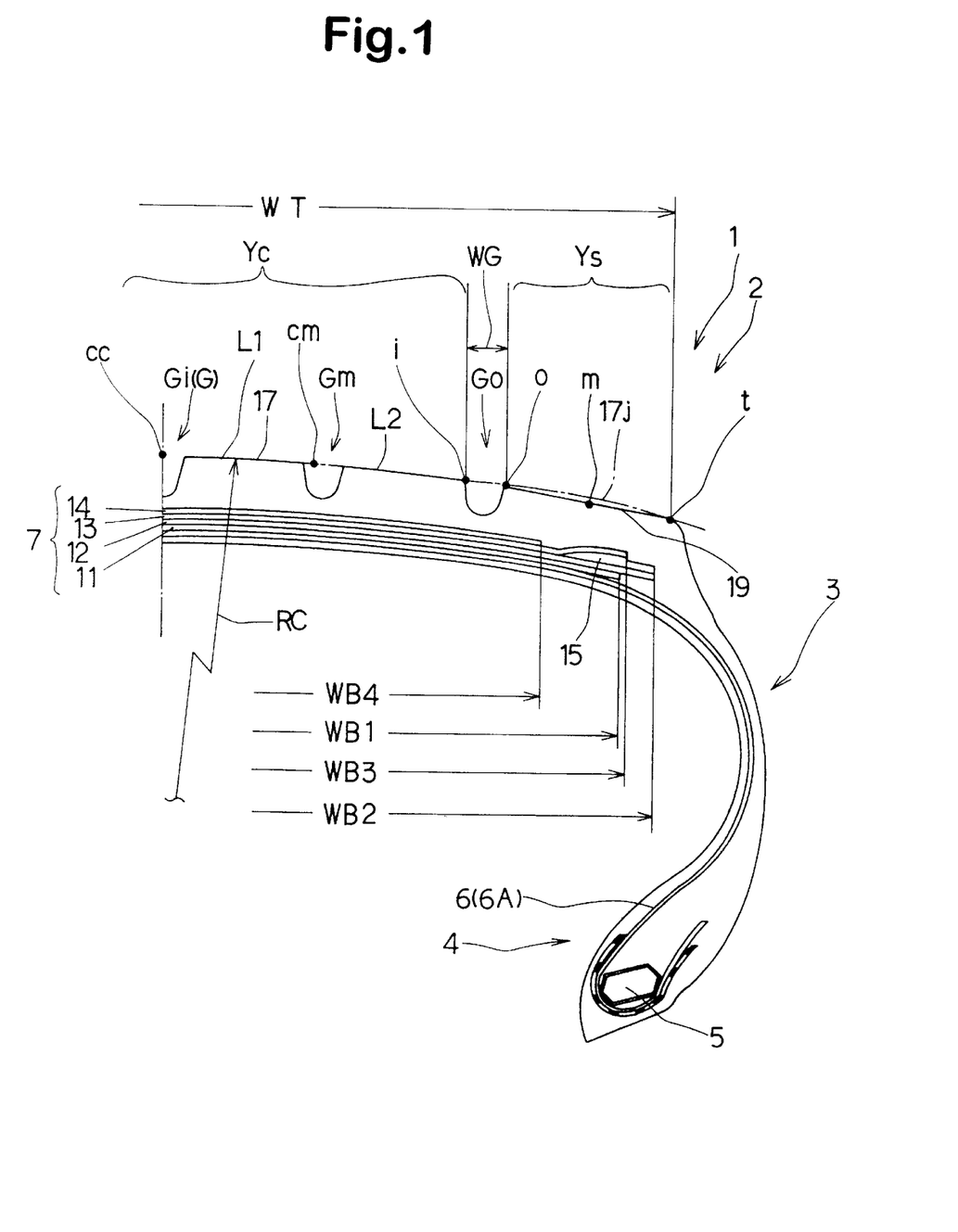
FIG. 1 is a sectional view of a tire according to the present invention.

In FIG. 1, a heavy duty radial tire 1 comprises a tread portion 2, a pair of axially spaced bead portions 4 with a bead core 5 therein, a pair of sidewall portions 3 extending between the tread edges and the bead portions 4, a carcass 6 extending between the bead portions 4, a belt 7 disposed radially outside the carcass 7 and inside a rubber tread. The aspect ratio of the tire is not more than 60%, for example 45%.

The carcass 6 comprises at least one ply, in this example a single ply 6A of cords arranged radially at an angle of 70 to 90 degrees in the tire circumferential direction. The carcass ply 6A is turned up around the bead core 5 in each bead portion 4 from the inside to outside of the tire. For the carcass cords, steel cords are preferably used, but organic fiber cords of nylon, rayon, polyester and the like may be also used.

The belt 7 comprises at least two cross breaker plies of high strength cords such as steel cords laid at angles of 10 to 40 degrees to the tire circumferential direction. In this example, the belt comprises first-fourth belt plies 11, 12, 13 and 14 disposed radially outwardly in this order.

The maximum axial width of the belt is about 0.98 to 0.85 times, for example, 0.96 times of the ground contact width WT. In this example, the second ply 12 is widest, and the fourth ply 14 is narrowest. The second ply 12 is substantially the same width as the third ply 13. The axial widths WB1 and WB3 of the first and third plies 11 and 13, respectively are about 0.95 to 0.90 of the axial width WB2 of the second ply 12 or the above-mentioned maximum width. The axial width WB4 of the radially outermost fourth ply 14 is 10 to 45% smaller than the width WB3, and it is disposed to protect the inner plies 11, 12, 13 from external damage.

In this example, the inclination angles of the belt plies 12, 13 and 14 are the same absolute values, for example 18 degrees. and the inclination angle of the belt ply 11 is a relatively large absolute value, for example 50 degrees with respect to the tire circumferential direction. As to the inclining directions, between the second and third belt plies 12 and 13, the directions are changed.

The third belt ply 13 is spaced apart from the second belt ply 12 in the axial edges. The space is filled with a buffer rubber 15 for enhancing the belt durability by alleviating the stress concentration at the ply edge.

Figure 2:
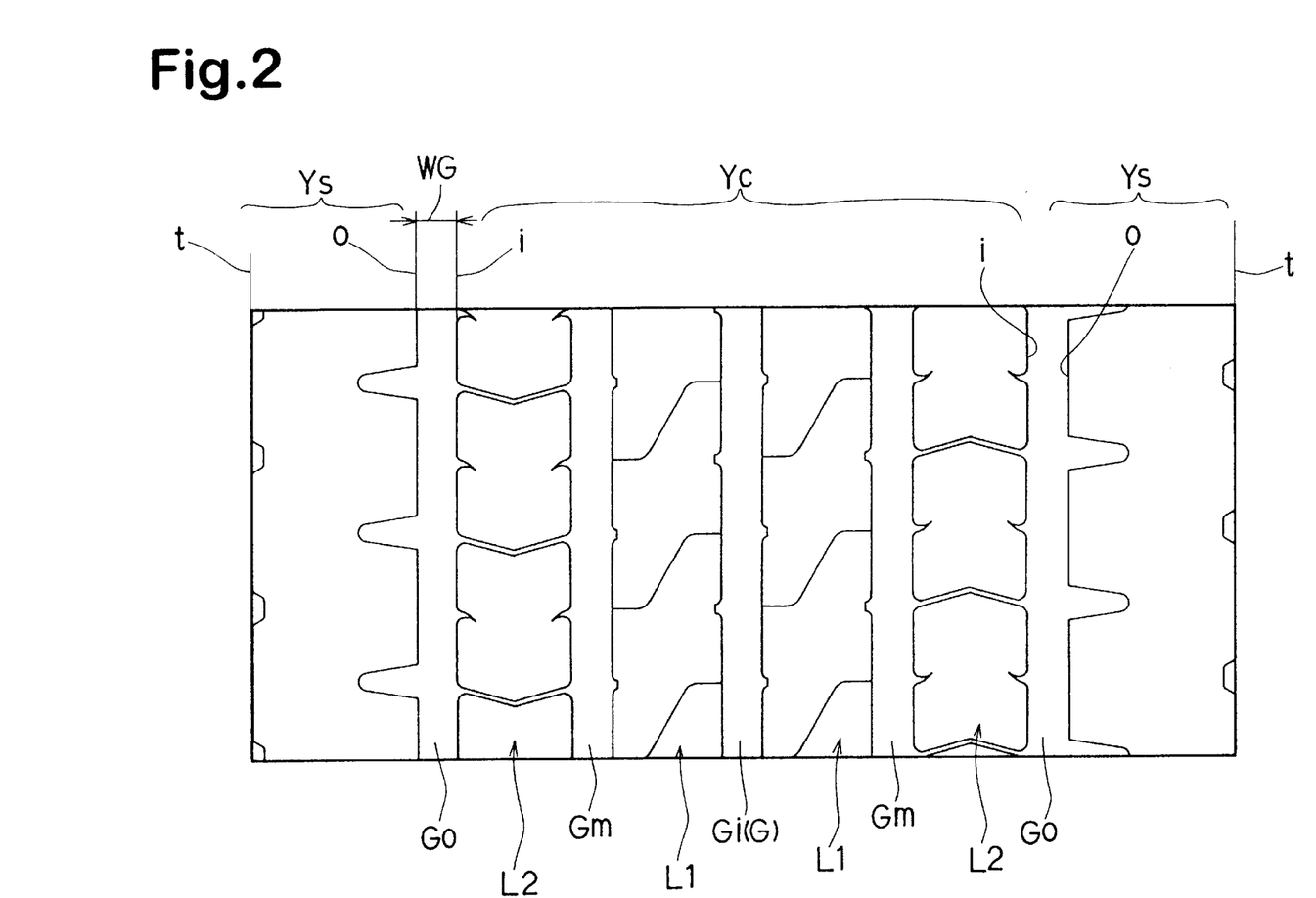
FIG. 2 is a developed plan view showing an example of the tread pattern.

The tread portion 2 is provided with at least two longitudinal main grooves G having an axial width WG of not less than 3% of the ground contact width WT and not less than 8 mm, and extending continuously in the tire circumferential direction in a linear or zigzag form.

The ground contact width is defined as the axial width between the axially outermost edges (tread edges) of the ground contacting area of the tire which is mounted on a standard rim and inflated to a standard pressure and loaded with a standard load. The standard rim is the "standard rim" specified in JATMA, the "Measuring Rim" in ETRTO, the "Design Rim" in TRA or the like. The standard pressure is the maximum air pressure in JATMA, the "Inflation Pressure" in ETRTO, the maximum pressure given in the "Tire Load Limits at Various Cold Inflation Pressures" table in TRA or the like. The standard load is the maximum load capacity in JATMA, the "Load Capacity" in ETRTO, the maximum value given in the above-mentioned table in TRA, the "Load Capacity" in ETRTO or the like.

In this example, the longitudinal main grooves G comprise a central groove Gi extending on the tire equator, a pair of axially outer grooves Go, and a pair of middle grooves Gm therebetween, whereby the tread portion 2 is divided into six axial parts, and in this invention the axially outermost parts are called tread shoulder region (ys). That is, each tread shoulder region (ys) is defined between the axially outer edge (o) of the outermost main groove Go and the adjacent tread edge (t). The axial width Ws of this region (ys) is in the range of from 0.10 to 0.25 times, for example 0.17 times the ground contact width WT. Under the tread shoulder region (ys), the axial edges of the above-mentioned belt plies 11 to 14 are disposed. Further, the region between the axially inner edges (i) of the axially outermost main grooves Go is called tread central region Yc.

In the tread central region Yc, the surface line of the ground contacting surface, namely, the tread profile is formed by a convex curve 17 which is, in this example, a single radius curve having a large radius Rc and the center is placed on the tire equator. Preferably, the radius Rc is in the range of 2 to 3.0 times of the ground contact width to maintain a wide tread.

It is however, possible to use a multi-radius curve, ellipse, cycloid curve and the like to obtain an appropriate ground pressure distribution.

Incidentally, the tread profile of the tread central region Yc in this example is collectively formed by the outer surface of the axially inner portions L1 between the main grooves Gi and Gm, and the outer surface of the middle portions L2 between the main grooves Gm and Go.

Figure 3:
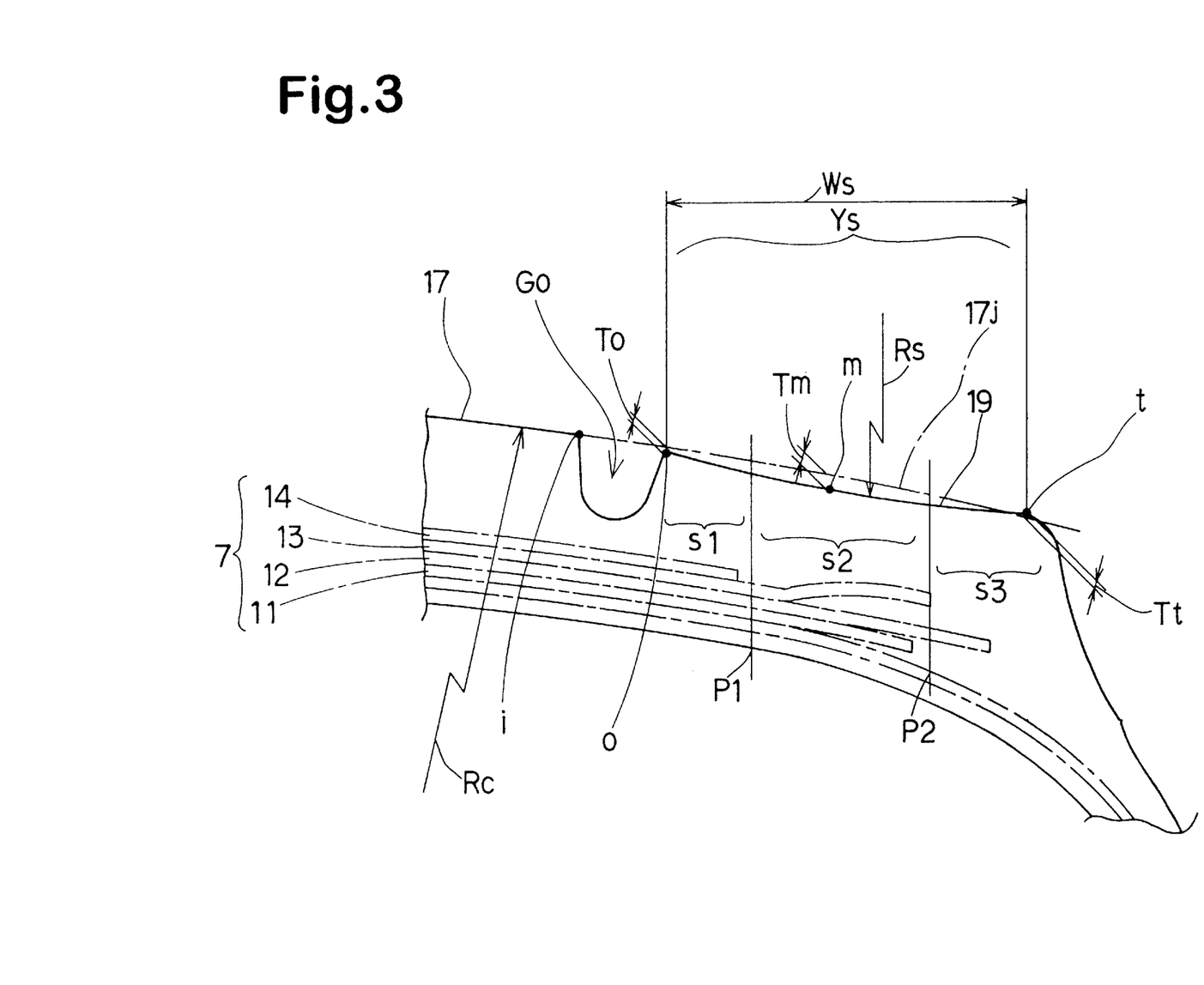
FIG. 3 is a enlarged sectional view of the tread shoulder region.

In the tread shoulder region (ys), the tread profile is, as shown in FIG. 3, composed of a concave curve 19 extending continuously from the edge (o) to the tread edge (t). At least the deepest point (m) thereof is positioned radially inward of a standard line 17j. The standard line 17j is a circular arc passing three points (cc, i and cm) on the convex curve 17 at the tire equator (cc), at the inner edge (i) of the main groove Go and in the middle (cm) thereof, respectively. Thus, when the convex curve 17 is a single radius curve, the standard line 17j is simply an extension of the convex curve 17. The deepest point (m) is preferably set in the part (s2) between an inner position P1 being 0.25 times Ws axially outwards from the edge (o) and an outer position P2 being 0.75 times Ws axially outwards from the edge (o).

In this example, the concave curve 19 has a single radius Rs being smaller than the above-mentioned radius Rc. Accordingly, the deepest point (m) is exactly centered on this region. Preferably, the radio Rs/Rc of the radii is 0.35 to 0.75. If the position of the deepest point (m) is out of the center part (s2), the ground contact pressure in this part (s2) is not sufficiently decreased, and it is hard to obtain a uniform ground pressure distribution. If the ratio Rs/Rc is smaller than 0.35, the ground contact pressure in the part (s2) is excessively decreased locally and uneven wear may occur in such area. If the ratio Rs/Rc exceeds 0.75, it is hard to suppress the temperature rise sufficiently.

To suppress the belt damage and uneven wear, the relative positions of the above-mentioned points (o, m and t) of the shoulder region (ys) to the standard line 17j are set such that the distances To, Tm, Tt thereof measured normally to and radially outwardly from the standard line 17j satisfy Tt>To>Tm. This relationship is not based on the absolute values. If the point is outward of the standard line, the distance is plus. Contrary, the point is inward, the distance is minus. Preferably, the distance To is in the range of −3 to 0% of the width Ws. The distance Tm is in the range of −7 to −2% of the width Ws. The distance Tt is in the range of 0 to +3% of the width Ws. Further, the differences thereof Tt−To, Tt−Tm, and To−Tm are preferably in the range of not more than 1% of the width Ws.

If the distance To is larger than 0%, the ground contact pressure near the edge (o) becomes too high and the heat generation is increased. If less than −3%, the load applied near the tread edge (t) is increased, and rubber defect is likely to occur in this region. Still worse, the rubber defect may lead to uneven wear.

If the distance Tm is larger than −2%, the effect on suppressing the belt damage and uneven wear is not exhibited sufficiently. If less than −7%, same as in the case of the distance To, rubber defect is likely to occur near the tread edge (t).

If the distance Tt is larger than 3%, the ground contact pressure near the tread edge (t) is increased too high and heat generation is increased and rubber defect is likely to occur. If less than 0%, the circumferential length of the tread edge (t) decreases, and slipping with the road surface occurs.

To provide more traction and drainage, the above-mentioned tread central region Yc can be provided with axial sipes, axial narrow grooves and/or axial wide grooves extending across the entire axial width of the land portion L1, L2. However, it is preferable that the tread shoulder regions (ys) are continuous in the tire circumferential direction. Therefore, axial grooves at least one end of which terminats within the width may be provided.

Comparison Tests

Test tires (size 445/45R19.5) having the same structure shown in FIGS. 1 to 3 except for the tread shoulder profile were made and tested for the high speed durability and uneven wear resistance. The common data are as follow:

Ground contacting width WT: 38 6 mm
Main groove width WG: 15 mm
Carcass
Number of ply: 1
Cord material: steel
Cord angle: 90 degrees
Belt
Number of ply: 4
Cord material: steel
Cord angles: −50/−18/+18/+18 (1st to 4th ply)
Ply width: 340/370/350/280 mm (1st to 4th ply)
Other specifications of the test tires and the test results are shown in Table 1.

High speed durability test: Using a tire test drum, the running speed was increased from 80 km/h at steps of 10 km/h in every 120 minutes, and the speed when a visible defect was observed (damage onset speed) was measured.

Rim size: 14.00×19.5 (standard rim)
Air pressure: 90 kpa
Tire load: 5000 kgf

In the table 1, the value "0" means that the damage onset speed was same as in Reference tire 1, and "+1" and "+2" respectively indicate that the damage onset speed is higher than in Reference tire by 10 km/h and 20 km/h, respectively.

Uneven wear resistance test: The test tires were mounted on the rim wheels on the trailer shaft of a 2-DD-444 wheel type trailer truck, and run for 70,000 km on a test course (80% of the length was paved, but 20% was unpaved). Then the depth of wear occurring in the tread shoulder region was measured.

Rim size: 14.00×19.5 (standard rim)
Air pressure: 90 kpa

In the table 1, as the uneven wear resistance, the reciprocals of the depths are indicated by an index based on Reference tire 1 being 100. Thus, for example, "140" means that the depth of wear is $1/1.4$ (=0.71 times) of the reference tire 1.

TABLE 1

Figure 5:
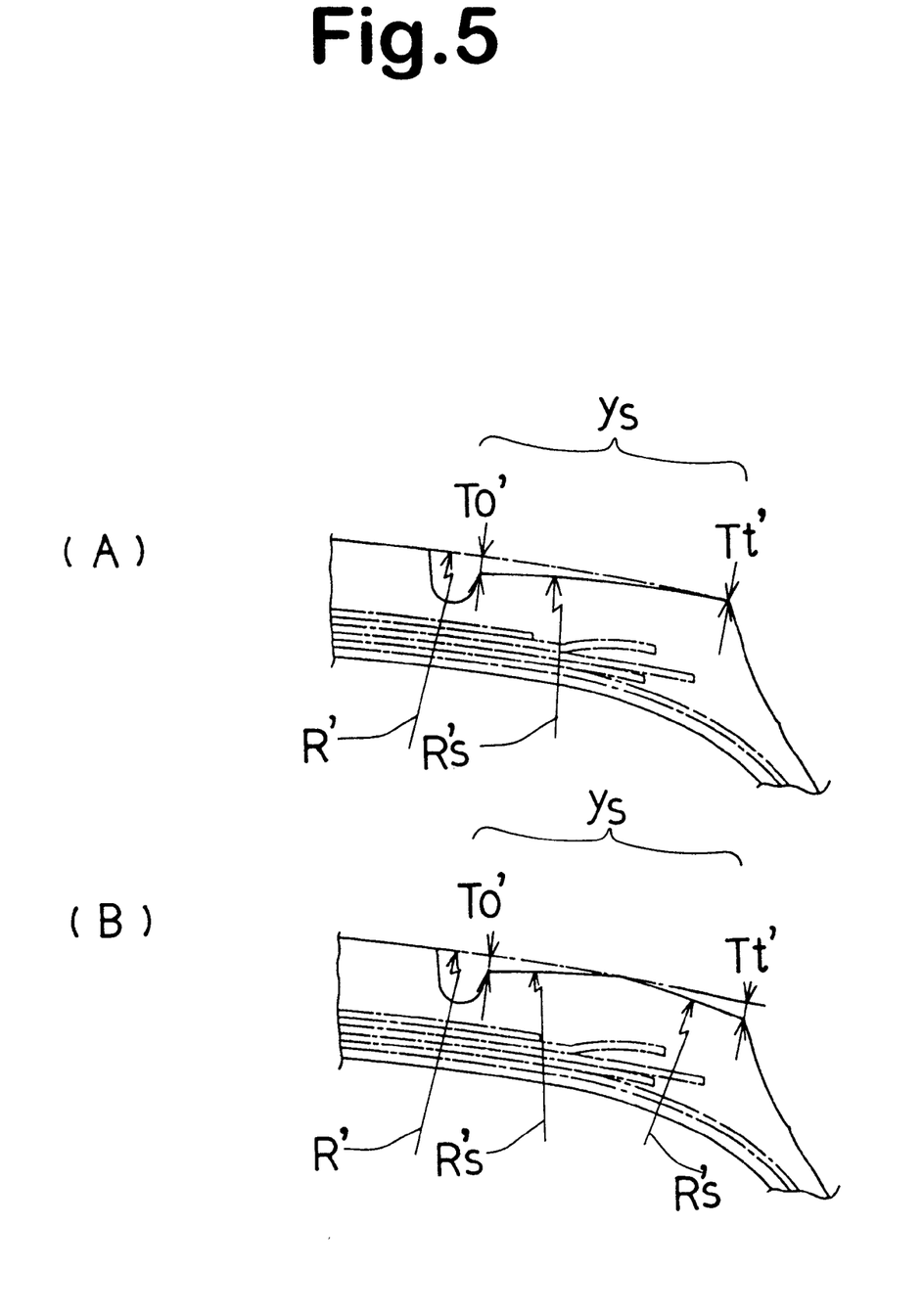
FIGS. 5A to 5E depict reference tires.

| Test Tire | Ref. 1 | Ref. 2 | Ref. 3 | Ref. 4. | Ref. 5 | Ex. 1 | Ex. 2 | Ex. 3 | Ex. 4 |
|---|---|---|---|---|---|---|---|---|---|
| RC *1 (mm) | 850 | 850 | 850 | 850 | 850 | 850 | 850 | 850 | 850 |
| Tread shoulder profile | FIG. 4 (A) | FIG. 4 (B) | FIG. 4 (C) | FIG. 5 (A) | FIG. 5 (B) | FIG. 3 | FIG. 3 | FIG. 3 | FIG. 3 |
| Width Ws (mm) | 65 | 65 | 65 | 65 | 65 | 65 | 65 | 65 | 65 |
| To/Ws (%) | 0 | 0 | −3 | −3 | −3 | 0 | −2 | −2 | −2 |
| Tm/Ws (%) | 0 | — | — | — | — | −3 | −3 | −5 | −7 |
| Tt/Ws (%) | 0 | −3 | −3 | 0 | −3 | 0 | 0 | 0 | 0 |
| Rs (mm) | — | 400 | — | 400 | 400 | 335 | 578 | 232 | 146 |
| High speed durability | 0 | 1 | 2 | 0 | 0 | 2 | 2 | 2 | 2 |
| Uneven wear resistance | 100 | 80 | 90 | 100 | 80 | 140 | 170 | 170 | 120 |

| Test Tire | Ex. 5 | Ex. 6 | Ex. 7 | Ex. 8 | Ref. 6 |
|---|---|---|---|---|---|
| RC *1 (mm) | 850 | 850 | 850 | 850 | 850 |
| Tread shoulder profile | FIG. 3 | FIG. 3 | FIG. 3 | FIG. 3 | FIG. 3 |
| Width Ws (mm) | 65 | 65 | 65 | 65 | 65 |
| To/Ws (%) | −2 | −2 | −2 | −2 | 2 |
| Tm/Ws (%) | −10 | −3 | −3 | −3 | 0 |
| Tt/Ws (%) | 0 | 2 | 3 | 5 | 2 |
| Rs (mm) | 96 | 326 | 266 | 196 | 588 |
| High speed durability | 2 | 2 | 2 | 1 | 0 |
| Uneven wear resistance | 100 | 180 | 180 | 160 | 170 |

*1) single radius Rc (same as the radius R of curvature of the standard line)

In FIGS. 4 and 5, Rs', To', Tm', Tt', etc. of the reference tires correspond to the curvature Rs, distances To, Tm, Tt, etc. of the present invention, respectively.

As shown in Table 1, the example tires were improved in the high speed durability, and the occurrence of uneven wear was effectively prevented.

FIG. 6 shows footprints (A), (B) and (C) of the prior art tires having a tread shoulder profile corresponding to (A) and (B) in FIG. 4 and the example tire having the profile shown in FIG. 3.

Air pressure: 90 kpa
Tire load: 4000 kgf

As shown in FIG. 6, in the tire according to the invention, the ground contact pressure is equalized in the entire area of the tread shoulder region (ys), and the maximum ground contact pressure is decreased.

The distance To has a large effect on the difference in the ground contact pressure between the inner part (s1) and outer edge potion (c1). By setting To<=0, the difference in the ground pressure between the inner part (s1) and outer edge portion (c1) is decreased to improve the uneven wear resistance. Further, as the distance Tt at the tread edge where uneven wear is most likely to occur is maximum, especially when Tt>=0, slipping between the tread edge (t) and road surface can be effectively controlled.

As described above, in the heavy duty radial tire of the present invention, the ground contact pressure distribution is equalized in the tread shoulder region, and the uneven wear can be prevented. Further, the belt can be prevented from being damaged. Thus, the high speed durability is improved.

We claim:

1. A heavy duty radial tire comprising
    a radial carcass ply extending between bead portions through a tread portion and side wall portions, and turned up around a bead core in each bead portion,
    a belt disposed radially outside said carcass ply and inside the tread portion, the belt comprising two plies of cords laid at angles of 10 to 40 degrees to the tire circumferential direction, the tread portion provided with two main grooves extending in the tire circumferential direction to divide the tread portion into a central region between the axially inner edges of said two main grooves, and a pair of shoulder regions between the axially outer edges of said two main grooves and the axial edges of the tread portion,
    the profile of the tread portion being a convex curve in the central region but a concave curve in each of the shoulder regions,
    said concave curve extending across the entire shoulder region and passing radially inwards of a standard line at least partially,
    on each side of the tire equator, the standard line being defined as a circular arc passing three points on the tread profile in the central region at the tire equator, at the axially inner edge of the main groove and at the middle of the main groove.

2. The heavy duty radial tire according to claim 1, wherein, when the distance is measured, in the shoulder region, normally to and radially outwardly from said standard line to the tread profile distances To, Tt and Tm at the axially outer edge of the main groove, the tread edge and the deepest point therebetween, respectively, satisfy
    $Tt>To>Tm$.

3. The heavy duty radial tire according to claim 2, wherein said distances To, Tt and Tm are as follows:
    $Tt \geqq 0$,
    $To \geqq 0$, and
    $Tm < 0$.

4. The heavy duty radial tire according to claim 1, wherein an axial width Ws of each shoulder region is in the range of from 0.10 to 0.25 times the ground contacting width of the tire, and the distance To is in the range of −3 to 0% of the width Ws, the distance Tm is in the range of −7 to −2% of the width Ws, and the distance Tt is in the range of 0 to +3% of the width Ws.

5. The heavy duty radial tire according to claim 2, wherein an axial width Ws of each shoulder region is in the range of from 0.10 to 0.25 times the ground contacting width of the tire, and the distance Tm is in the range of −7 to −2%. of the width Ws, and the distance Tt is in the range of 0 to +3% of the width Ws.

6. The heavy duty radial tire according to claim 3, wherein an axial width Ws of each shoulder region is in the range of from 0.10. to 0.25 times the ground contacting width of the tire, and the distance Tm is in the range of −7 to −2% of the width Ws, and the distance Tt is in the range of 0 to +3% of the width Ws.

7. The heavy duty radial tire according to claim 2, wherein said distances To, Tt and Tm are related as follows:
    $Tt=0>To>Tm$.

8. The heavy duty radial tire according to claim 1, wherein the ratio Rs/Rc of the radius Rc of said convex curve and the radius Rs of said concave curve are in the range of from 0.35 to 0.75.

9. The heavy duty radial tire according to claim 1, wherein an axial width Ws of each shoulder region is in the range of from 0.10 to 0.25 times the ground contacting width of the tire.

* * * * *